United States Patent
Attard et al.

(10) Patent No.: US 10,221,794 B1
(45) Date of Patent: Mar. 5, 2019

(54) MEASUREMENT, MODELING, AND ESTIMATION OF SCAVENGING AIRFLOW IN AN INTERNAL COMBUSTION ENGINE

(71) Applicants: William P Attard, Brighton, MI (US); Shuonan Xu, Troy, MI (US); Tyler Tutton, Royal Oak, MI (US); Edward D Docherty, Washington, MI (US)

(72) Inventors: William P Attard, Brighton, MI (US); Shuonan Xu, Troy, MI (US); Tyler Tutton, Royal Oak, MI (US); Edward D Docherty, Washington, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/805,359

(22) Filed: Nov. 7, 2017

(51) Int. Cl.
| | |
|---|---|
| *F02D 41/14* | (2006.01) |
| *F02D 41/24* | (2006.01) |
| *F02D 37/02* | (2006.01) |
| *F02D 35/02* | (2006.01) |

(52) U.S. Cl.
CPC ....... *F02D 41/1458* (2013.01); *F02D 35/024* (2013.01); *F02D 37/02* (2013.01); *F02D 41/1453* (2013.01); *F02D 41/24* (2013.01); *F02D 2200/0402* (2013.01)

(58) Field of Classification Search
CPC .. F02D 41/1458; F02D 41/1453; F02D 41/24; F02D 35/024; F02D 37/02; F02D 2200/0402
USPC ........................................................ 701/103
See application file for complete search history.

(56) References Cited

U.S. PATENT DOCUMENTS

| | | | |
|---|---|---|---|
| 5,051,909 A * | 9/1991 | Gomez | F02D 41/145 |
| | | | 123/65 E |
| 5,517,955 A | 5/1996 | Yoshioka | |
| 6,827,051 B2 | 12/2004 | Kawasaki et al. | |
| 8,001,833 B2 | 8/2011 | Delp | |
| 9,399,962 B2 | 7/2016 | Hagner et al. | |
| 2008/0077304 A1* | 3/2008 | Suzuki | F02B 37/013 |
| | | | 701/102 |
| 2009/0070009 A1* | 3/2009 | Delp | F02D 41/1497 |
| | | | 701/103 |
| 2010/0313549 A1* | 12/2010 | Santoso | F02D 37/02 |
| | | | 60/285 |
| 2012/0316756 A1* | 12/2012 | Tsuyuki | F02D 35/023 |
| | | | 701/104 |
| 2014/0020656 A1* | 1/2014 | Kosaka | F02D 13/0265 |
| | | | 123/348 |

(Continued)

*Primary Examiner* — Mahmoud Gimie
(74) *Attorney, Agent, or Firm* — Ralph E Smith (57) ABSTRACT

A control system and method utilize an intake manifold absolute pressure (MAP) and an engine speed (RPM) sensor and a controller configured to obtain a model surface relating various measurements of the RPM sensor and valve overlap durations to modeled scavenging ratios of an engine, obtain a calibrated multiplier surface relating various measurements of the MAP and RPM sensors to measured scavenging ratios of the engine, determine a modeled scavenging ratio of the engine based on the measured engine speed and a known overlap duration using the model surface, determine a scavenging ratio multiplier based on the measured MAP and measured engine speed using the calibrated multiplier surface, determine the scavenging ratio of the engine by multiplying the modeled scavenging ratio by the scavenging ratio multiplier, and control the engine based on the scavenging ratio.

20 Claims, 5 Drawing Sheets

(56) References Cited

U.S. PATENT DOCUMENTS

2015/0275782 A1* 10/2015 Moriguchi .............. F02D 41/18
　　　　　　　　　　　　　　　　　　　　　60/605.1
2016/0369729 A1* 12/2016 Yoshinaga .......... F02D 41/1486
2017/0204801 A1*  7/2017 Sharma ............... F02D 41/3064

* cited by examiner

MEASUREMENT, MODELING, AND ESTIMATION OF SCAVENGING AIRFLOW IN AN INTERNAL COMBUSTION ENGINE

FIELD

The present application generally relates to turbocharged engines and, more particularly, to techniques for estimating the scavenging ratio of an internal combustion engine and related control techniques.

BACKGROUND

An internal combustion engine draws air into cylinders via an induction system and into an intake manifold through an induction pipe that is regulated by a throttle valve. For turbocharged applications, the induction system comprises a compressor of a turbocharger that forces air into through the induction pipe and into the intake manifold. The air in the intake manifold is distributed to a plurality of cylinders via respective intake valves and is combined with fuel to create an air/fuel mixture. The air/fuel mixture is combusted (e.g., by spark from respective spark plugs) within the cylinders to drive pistons that generate torque at a crankshaft. The exhaust gas resulting from combustion is expelled from the cylinders and into an exhaust system via respective exhaust valves. For turbocharged applications, the kinetic energy of the exhaust gas drives a turbine of the turbocharger (which in turn drives the compressor via a shaft) and the exhaust gas is treated by an exhaust treatment system to decrease emissions prior to its release into the atmosphere.

Scavenging refers to the operation of the engine such that opening of the intake and exhaust valves overlaps, and the cylinder delta pressure between intake and exhaust forces the air charge to blow through the cylinder and exit via the exhaust valve. Scavenging operation is capable of increasing engine performance. For turbocharged applications, this is true particularly at certain operating conditions such as low engine speeds where exhaust energy available for the turbocharger is low. The scavenging ratio represents a ratio of the total air charge flowing through each cylinder to an air charge trapped in each cylinder. For example, a scavenging ratio of 1.10 indicates that 10% of the total air charge blows through the cylinder or rather is not trapped. An inverse of the scavenging ratio represents a trapping efficiency. For example, a scavenging ratio of 1.10 corresponds to a trapping efficiency of ~91%. The scavenging ratio/trapping efficiency of an engine is utilized for a variety of important controls. Non-limiting examples of engine controls that utilize the scavenging ratio include airflow, fueling, spark timing, and emissions controls.

Conventional techniques for estimating the scavenging ratio of the engine, however, are inaccurate, which results in inaccurate controls. One conventional technique involves comparing airflow to engine torque output. Not all of an engine's airflow, however, is converted to torque, e.g., due to varying combustion characteristics contributed by various air/fuel ratio, spark timing, and other factors. Another conventional technique involves measuring oxygen in the exhaust gas. The reason that using an oxygen sensor for scavenging ratio measurement is not ideal is because the oxygen sensor reading will be corrupted due to a mixture of air and fuel that is present at the sensor. That is, the sensor operates well when only air or fuel is present; however, when both air and fuel are present at the sensor (which is true while scavenging is active), the sensor reading (air/fuel ratio) no longer represents the true value, and thus cannot be trusted. Accordingly, while such scavenging ratio estimation systems work well for their intended purpose, there remains a need for improvement in the relevant art.

SUMMARY

According to one example aspect of the invention, a system for estimating a scavenging ratio of an engine of a vehicle, the scavenging ratio relating to an overlap of opening of intake and exhaust valves of a cylinder of the engine, is presented. In one exemplary implementation, the system comprises: an intake manifold absolute pressure (MAP) sensor configured to measure a pressure of air in an intake manifold of the engine; an engine speed (RPM) sensor configured to measure a speed of the engine; and a controller of the engine, the controller being configured to: obtain a model surface relating various measurements of the RPM sensor and valve overlap durations to modeled scavenging ratios of the engine; obtain a calibrated multiplier surface relating various measurements of the MAP and RPM sensors to measured scavenging ratios of the engine; determine a modeled scavenging ratio of the engine based on the measured engine speed and a known overlap duration using the model surface; determine a scavenging ratio multiplier based on the measured MAP and measured engine speed using the calibrated multiplier surface; determine the scavenging ratio of the engine by multiplying the modeled scavenging ratio by the scavenging ratio multiplier; and control the engine based on the scavenging ratio.

In some implementations, the system further comprises: a mass airflow (MAF) sensor configured to measure airflow into the engine; an emissions analyzer configured to measure carbon monoxide (CO) content in exhaust gas produced by the engine; and a calibration system in communication with the controller and configured to coordinate a limited range CO sweep including: commanding a target fuel/air ratio (FA) for the engine; obtaining the measured CO content in the exhaust gas; when the measured CO content is outside of a threshold range, coordinating a decrease in the target FA and reobtain the measured CO content; when the measured CO content is within the threshold range, obtaining an in-cylinder stoichiometric FA by coordinating an increase in the target FA until a magnitude of a difference between a current measured CO content and a previously measured CO content is less than a threshold; determining a first estimate of the scavenging ratio of the engine based on measured airflow into the engine, the in-cylinder stoichiometric FA, and a stoichiometric FA for a liquid fuel of the engine; and generating at least a portion of the calibrated multiplier surface based on the first estimated scavenging ratio. In some implementations, the calibration system is configured to coordinate the limited range CO sweep during steady state conditions where engine speed and load are held stable.

In some implementations, the system further comprises: an intake gas pressure sensor configured to measure a pressure of intake gas proximate to the intake valve of the cylinder; and an exhaust gas pressure sensor configured to measure a pressure of the exhaust gas proximate to the exhaust valve of the cylinder, wherein the calibration system is configured to coordinate a pressure-based estimation including: estimating an in-cylinder gas pressure based on the measured intake and exhaust gas pressures and an estimated exhaust valve flow rate; based on the estimated in-cylinder gas pressure, obtaining an estimated intake valve flow rate and the estimated exhaust valve flow rate; estimating a total intake air mass based on the estimated intake valve flow rate; estimating a scavenged mass based on the estimated intake and exhaust valve flow rates; determining a second estimate of the scavenging ratio of the engine based on the estimated total intake air mass and the estimated scavenging mass; and generating at least a portion of the calibrated multiplier surface based on the second estimated scavenging ratio. In some implementations, the calibration system is configured to coordinate the pressure-based estimation during transient conditions where at least one of the engine speed and load change by more than a threshold amount or at more than a threshold rate.

In some implementations, the controller is further configured to: determine a target total air charge for each cylinder of the engine based on an engine torque request; determine a target trapped air charge based on a product of the target total air charge and an estimated trapping efficiency of the engine, the estimated trapping efficiency being an inverse of the estimated scavenging ratio; and control spark timing of the engine based on the target trapped air charge.

According to another example aspect of the invention, a method of determining a scavenging ratio of an engine of a vehicle, the scavenging ratio relating to an overlap of opening of intake and exhaust valves of a cylinder of the engine, is presented. In one exemplary implementation, the method comprises: obtaining, by a controller of the engine and from an intake manifold absolute pressure (MAP) sensor, a measured pressure of air in an intake manifold of the engine; obtaining, by the controller and from an engine speed (RPM) sensor, a measured speed of the engine; obtaining, by the controller, a model surface relating various measurements of the RPM sensor and valve overlap durations to modeled scavenging ratios of the engine; obtaining, by the controller, a calibrated multiplier surface relating various measurements of the MAP and RPM sensors to measured scavenging ratios of the engine; determining, by the controller, a modeled scavenging ratio of the engine based on the measured engine speed and a known overlap duration using the model surface; determining, by the controller, a scavenging ratio multiplier based on the measured MAP and measured engine speed using the calibrated multiplier surface; determining, by the controller, the scavenging ratio of the engine by multiplying the modeled scavenging ratio by the scavenging ratio multiplier; and controlling, by the controller, the engine based on the scavenging ratio.

In some implementations, the method further comprises coordinating, by a calibration system in communication with the controller, a limited range carbon monoxide (CO) sweep comprising: coordinating, by the calibration system, a target fuel/air ratio (FA) for the engine; obtaining, by the calibration system and from a mass airflow (MAF) sensor, a measure airflow into the engine; obtaining, by the calibration system and from an emissions analyzer, a measured CO content in exhaust gas produced by the engine; obtaining, by the calibration system and from an emissions analyzer, a measured carbon monoxide (CO) content in exhaust gas produced by the engine; when the measured CO content is outside of a threshold range, coordinating, by the calibration system, a decrease in the target FA and reobtain the measured CO content; when the measured CO content is within the threshold range, obtaining, by the calibration system, an in-cylinder stoichiometric FA by coordinating an increase in the target FA until a magnitude of a difference between a current measured CO content and a previously measured CO content is less than a threshold; determining, by the calibration system, a first estimate of the scavenging ratio of the engine based on measured airflow into the engine, the in-cylinder stoichiometric FA, and a stoichiometric FA for a liquid fuel of the engine; and generating, by the calibration system, at least a portion of the calibrated multiplier surface based on the first estimated scavenging ratio. In some implementations, the calibration system is configured to coordinate the limited range CO sweep during steady state conditions where engine speed and load are held stable.

In some implementations, the method further comprises coordinating, by the calibration system, a pressure-based estimation comprising: obtaining, by the calibration system and from an intake gas pressure sensor, a measured pressure of intake gas proximate to the intake valve of the cylinder; obtaining, by the calibration system and from an exhaust gas pressure sensor, a measured pressure of the exhaust gas proximate to the exhaust valve of the cylinder; estimating, by the calibration system, an in-cylinder gas pressure based on the measured intake and exhaust gas pressures and an estimated exhaust valve flow rate; based on the estimated in-cylinder gas pressure, obtaining, by the calibration system, an estimated intake valve flow rate and the estimated exhaust valve flow rate; estimating, by the calibration system, a total intake air mass based on the estimated intake valve flow rate; estimating, by the calibration system, a scavenged mass based on the estimated intake and exhaust valve flow rates; determining, by the calibration system, a second estimate of the scavenging ratio of the engine based on the estimated total intake air mass and the estimated scavenging mass; and generating, by the calibration system, at least a portion of the calibrated multiplier surface based on the second estimated scavenging ratio. In some implementations, the calibration system is configured to coordinate the pressure-based estimation during transient conditions where at least one of the engine speed and load change by more than a threshold amount or at more than a threshold rate.

In some implementations, the method further comprises: determining, by the controller, a target total air charge for each cylinder of the engine based on an engine torque request; determining, by the controller, a target trapped air charge based on a product of the target total air charge and an estimated trapping efficiency of the engine, the estimated trapping efficiency being an inverse of the estimated scavenging ratio; and controlling, by the controller, spark timing of the engine based on the target trapped air charge.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, there remains a need for accurate real-time estimation of the scavenging ratio of an internal combustion engine. Conventional techniques are inaccurate, which results in decreased engine performance and efficiency. Accordingly, improved techniques for measuring the scavenging ratio (trapping efficiency) of an engine are presented. Two specific techniques performed during dynamometer testing are discussed herein. A first technique is specific to steady-state conditions where engine actuators and ambient conditions (e.g., engine speed/load) are fixed and not changing during the test. This technique involves performing a limited-range carbon monoxide (CO) sweep to determine an in-cylinder stoichiometric fuel/air ratio (FA), which is utilized with a stoichiometric FA of the liquid fuel (e.g., gasoline) and other parameters (e.g., airflow) to estimate the scavenging ratio.

A second technique works for both steady-state and transient conditions. Transient conditions represent where engine actuators and/or ambient conditions (e.g., engine speed/load) change by more than a threshold amount or at more than a threshold rate during testing. This technique involves estimating an in-cylinder gas pressure based on measured intake/exhaust dynamic gas pressures and an estimated exhaust valve flow rate, obtaining an estimated intake valve flow rate and the estimated exhaust valve flow rate based on the estimated gas in-cylinder pressure, estimating a total intake air mass based on the estimated intake valve flow rate, estimating a scavenged mass based on the estimated intake/exhaust valve flow rates, and estimating the scavenging ratio of the engine based on the estimated total intake air and scavenged masses.

As discussed above, both techniques are performed at dynamometer testing. The results of these techniques are a learned surface that is utilized by the engine controller in real-time to determine the scavenging ratio of the engine. The inputs to this surface include engine speed (RPM) and intake manifold absolute pressure (MAP), which are measured by respective sensors. Other sensors utilized during the dynamometer testing, such as a mass air flow (MAF) sensor, intake and exhaust dynamic pressure sensors, and an exhaust gas concentration or emissions analyzer, are not required for the engine controller to determine the scavenging ratio. Thus, by eliminating these sensors from the actual production vehicle, costs and/or packaging size are reduced. The engine controller controls operation of the engine (e.g., spark timing) using the determined scavenging ratio.

Figure 1:
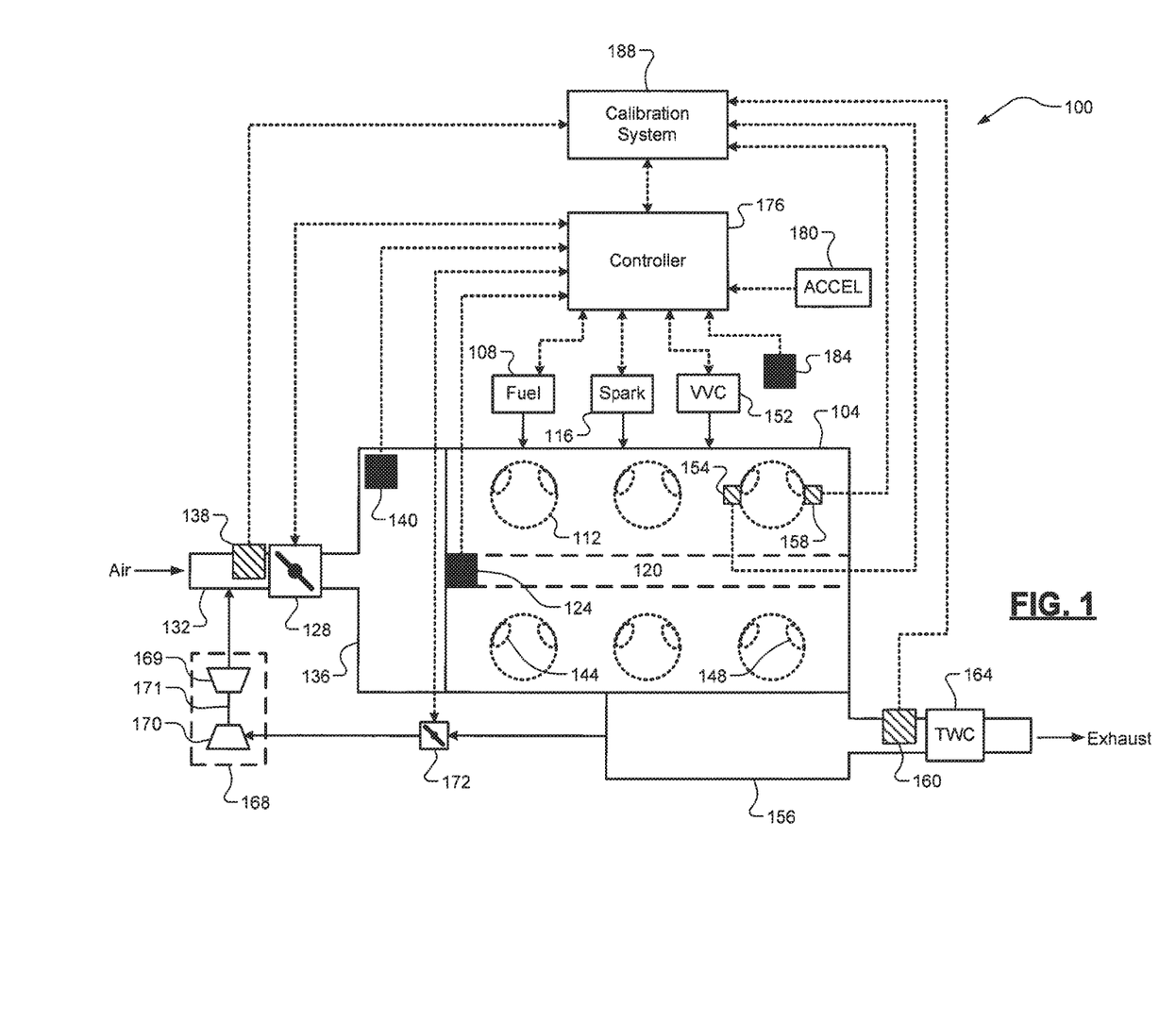
FIG. 1 is a diagram of an example system for a vehicle comprising an internal combustion engine with scavenging according to the principles of the present disclosure.

Referring now to FIG. 1, an example system 100 for calibration and control of an engine 104 is illustrated. The engine 104 is configured to combine air and a liquid fuel (e.g., gasoline) from fuel injectors 108 within cylinders 112 and combusts the air/fuel mixture using spark plugs 116 to drive pistons (not shown) that generate drive torque at a crankshaft 120. The drive torque at the crankshaft 120 is then transferred (e.g., via a transmission, not shown) to a driveline (not shown) to propel the vehicle. An engine speed (RPM) sensor 124 is configured to measure a rotational speed of the crankshaft 120. A throttle valve 128 controls the flow of air through an induction system 132 and into an intake manifold 136. A mass airflow (MAF) sensor 138 is temporarily connected to the induction system 132 upstream from the throttle valve 128 during dynamometer testing and measures a rate of airflow into the intake manifold 136. The MAF sensor 138, however, is not part of the vehicle powertrain. An intake manifold absolute pressure (MAP) sensor 140 is configured to measure a pressure of air in the intake manifold 136.

Intake and exhaust valves 144, 148 control the flow of air and exhaust in and out of each respective cylinder 112. The specific opening/closing of the intake and exhaust valves 144, 148 is controlled by a variable valve control (VVC) system 152 that controls lift and/or timing of the intake and exhaust valves 144, 148. In one exemplary implementation, the VVC system 152 could switch a different profile camshaft or camshafts (not shown) to operate the engine 104 in the scavenging mode. For example, the scavenging camshaft profile could be a specific camshaft profile for wide-open throttle (WOT) operation. Alternatively, the intake and exhaust valves 144, 148 could be electronically controlled by the VVC system 152 to dynamically control the opening to achieve adjustment of the overlap of the intake and exhaust valves 144, 148 and thereby vary the scavenging ratio of the engine 104. The exhaust gas is expelled from the cylinders 112 into an exhaust system 156 that treats the exhaust gas to reduce emissions prior to its release into the atmosphere.

Cylinder intake and exhaust pressure sensors 154, 158 are temporarily connected near intake/exhaust ports of at least one cylinder 112 during dynamometer testing and measure pressures of the intake air and exhaust gas at the upstream/downstream from the cylinder(s) 112. An exhaust gas concentration or emissions analyzer 160 is temporarily connected to the exhaust system 156 upstream from a catalyst 164 during dynamometer testing and measures values of constituents in or content of the exhaust gas (carbon monoxide (CO), carbon dioxide (CO2), hydrocarbons (HC), etc.). Again, these devices 154, 158, and 160 are not part of the vehicle's powertrain. In one exemplary implementation, the catalyst 164 of the exhaust system 156 is a three-way catalytic converter or TWC. An optional turbocharger system 168 comprising at least one turbocharger is configured to utilize the kinetic energy of the exhaust gas to drive a compressor 169 via a turbine 170 and a shaft 171 to force more air into the engine 104 via the induction system 128. A wastegate valve 172 is configured to control exhaust flow through the turbine 170, which allows for regulation of the boost pressure produced by the turbocharger system 168. A controller 176 of the engine 104 controls operation of the engine 104, including airflow (via the throttle valve 124), fuel (via the fuel injectors 108), and the turbocharger system 168 (e.g., boost pressure via the wastegate valve 172). An accelerator (ACCEL) pedal 180 or other suitable driver input device provides an input to the controller 176 indicative of a torque request for the engine 104. It will be appreciated that the controller 176 could receive measurements from other sensors 184, such as, but not limited to, an intake air temperature (IAT) sensor that measures intake air temperature and an exhaust gas temperature (EGT) sensor that measures exhaust gas temperature.

A calibration system 188 (e.g., dynamometer instrumentation) generates a calibration multiplier surface for use by the controller 176 in determining the scavenging ratio of the engine 104 in real-time. This calibration system 188 is separate from the engine 104 and controller 176 and is only utilized during dynamometer testing, e.g., prior to delivery of the vehicle. The calibration system 188 utilizes the MAF sensor 138, the intake/exhaust gas pressure sensors 154, 158, and the emissions analyzer 160. Each of these sensors 138, 154, 158, and 160 is temporarily connected to the engine 104 during dynamometer testing and data collection by the calibration system 188. This dynamometer testing includes, for example, the controller 176 operating the engine 104 (e.g., at steady-state or transient conditions), as well as the calibration system 188 coordinating with the controller 176 to perform the testing routines discussed in greater detail below. After testing is completed, the calibration system 188 generates and outputs the calibrated multiplier surface to the controller 176. By only utilizing these sensors during the calibration phase, the vehicle does not require these sensors 136, 154, 158, or 160, which thereby reduces vehicle costs and/or packaging size.

It will also be appreciated that the controller 176 and the calibration system 188 each performs at least a portion of the techniques of the present disclosure. The terms "controller" and "calibration system" as used herein each refers to any suitable control/calibration device or set of multiple control/calibration devices (e.g., a control or calibration system comprising different sub-system controllers) that is/are configured to perform at least a portion of the techniques of the present disclosure. Non-limiting examples of the controller and the calibration system include an application-specific integrated circuit (ASIC) and one or more processors and a non-transitory memory or a non-transitory computer-readable medium having instructions stored thereon that, when executed by the one or more processors, cause the controller or calibration system to perform a set of operations corresponding to at least a portion of the techniques of the present disclosure. The one or more processors could be either a single processor or two or more processors operating in a parallel or distributed architecture.

Figure 2:
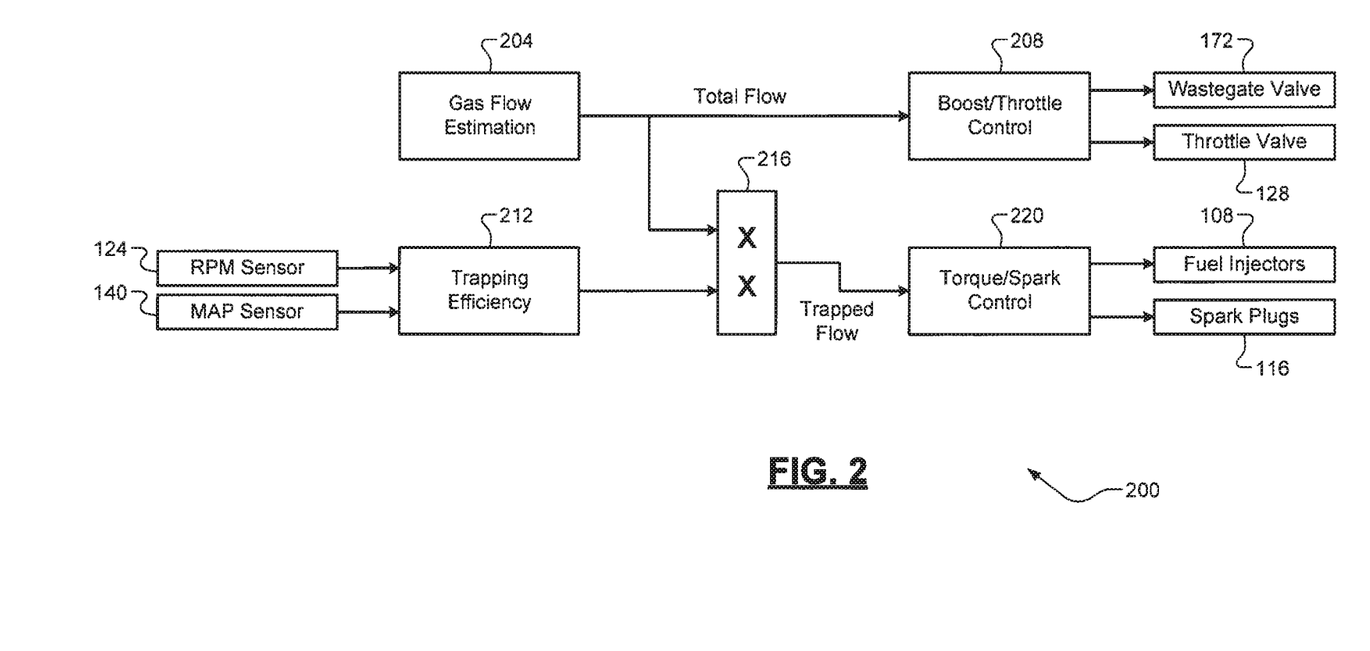
FIG. 2 is a functional block diagram of an example controller architecture for determining the engine scavenging ratio and utilizing the engine scavenging ratio (trapping efficiency) for controlling the engine according to the principles of the present disclosure.

Referring now to FIG. 2, a functional block diagram of an example architecture 200 for the controller 176 for determining and utilizing the engine scavenging ratio for controlling the engine 104 is presented. As previously mentioned, the term "scavenging ratio" refers to a ratio of a total air charge entering a cylinder 112 to a gas charge trapped in the cylinder 112. For example, a scavenging ratio of 1.10 indicates that 10% of the total air charge entering the cylinder 112 blows through the cylinder 112. The term "trapping efficiency," on the other hand, refers to a ratio of the trapped air charge to the total air charge. Thus, the trapping efficiency of the engine 104 is the inverse of its scavenging ratio, and these terms can therefore be used interchangeably. For example, a scavenging ratio of 1.10 would correspond to a trapping efficiency of ~91% (1.0/1.1), which indicates that 91% of the total air charge remains trapped in the cylinder 112 during scavenging.

A gas flow estimation routine 204 estimates a total intake air flow into the cylinder 112. The estimated total intake air flow is utilized by boost/throttle control routine 208 to control the throttle valve 128 and/or the wastegate valve 172. A trapping efficiency estimation 212 estimates the trapping efficiency of the engine 104. Inputs to the trapping efficiency estimation 208 include measured MAP from MAP sensor 140 and measured engine speed from engine speed (RPM) sensor 124. It will be appreciated that other inputs could also be utilized (e.g., intake/exhaust gas temperatures from other sensors 184).

The trapping efficiency estimation 212 utilizes a calibrated surface based on the dynamometer testing (and corresponding sensor measurements) discussed above and discussed in greater detail below. The estimated trapping efficiency is multiplied with the estimated total intake air flow at multiplier 216. The output of multiplier 216 is the estimated trapped flow or trapped charge within the cylinder 112. An estimated scavenged mass is the difference between the estimated total intake air charge flowing into the cylinder 112 and the estimated trapped charge within the cylinder. The estimated trapped charge is utilized by a torque/spark control routine 220 to control the fuel injectors 108 and/or the spark plugs 116. For example, the torque/spark control routine 220 could control spark timing (retardation/advance) based on the estimated trapped charge.

Figure 3:
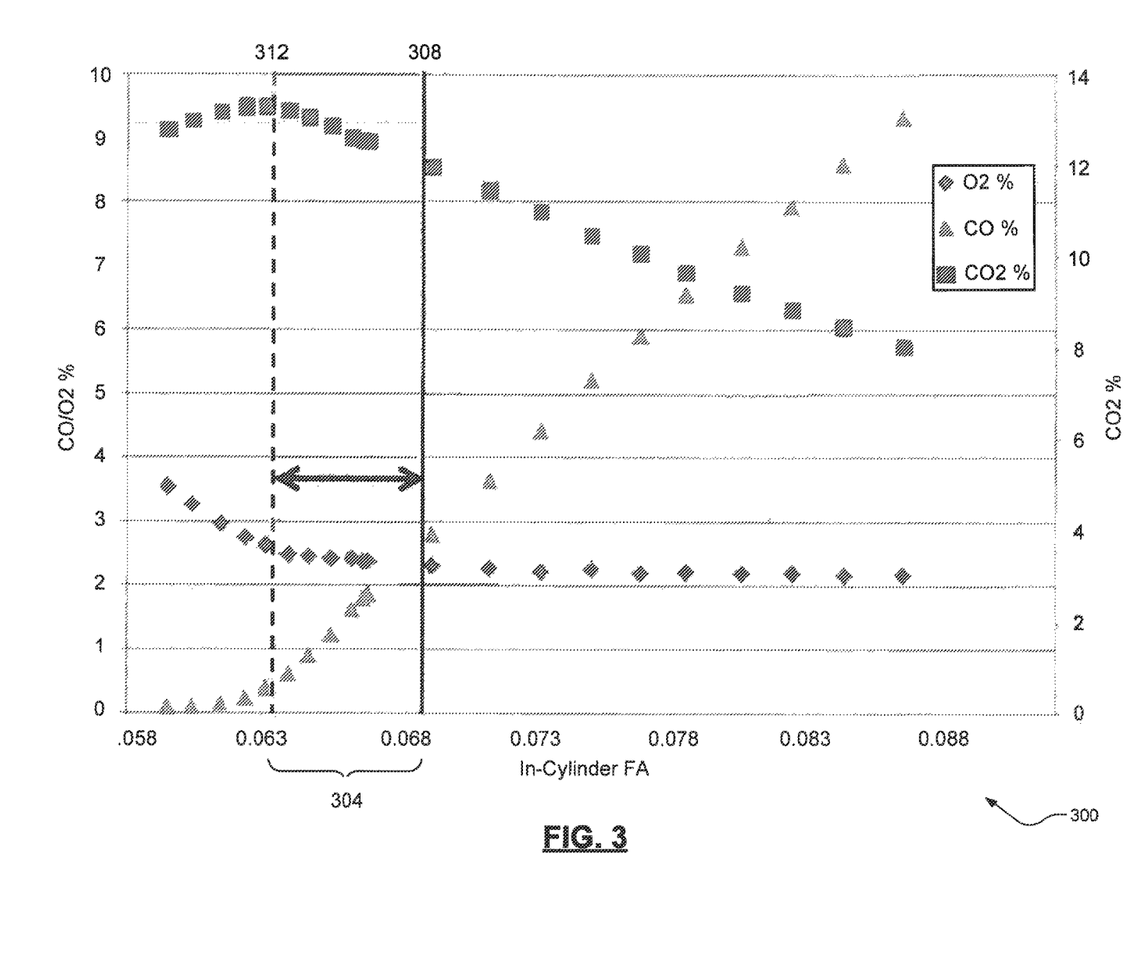
FIG. 3 is a plot of an example limited carbon monoxide (CO) sweep coordinated by a calibration system to determine an in-cylinder stoichiometric fuel/air ratio (FA) point for estimating the engine scavenging ratio during dynamometer testing at steady-state conditions according to the principles of the present disclosure.

Referring now to FIG. 3, a plot 300 of an example limited CO sweep coordinated/performed by the calibration system 188 to determine an in-cylinder stoichiometric FA point for estimating the engine scavenging ratio using the exhaust gas analyzer 160 during dynamometer testing at steady-state conditions as previously described herein is illustrated. A target FA is initially commanded and measurements are retrieved from the emissions analyzer 160. Examples of these measurements include a ratio of CO to O2 (left vertical axis) and amount of CO2 (right vertical axis). As previously discussed herein, CO and CO2 are preferable to O2 because using an O2 sensor results in corrupted measurements due to the presence of both air and fuel in the exhaust gas.

After command the target FA, the amount of CO is measured. If the amount of CO is within an expected range for the limited CO sweep, the target FA is increased (increased fueling, provided airflow is the same). Alternatively, if the amount of CO is outside of the expected range, the target FA is decreased (decreased fueling, provided airflow is the same) and the CO measurement is re-obtained and the process is repeated until the measured CO falls within the expected range. Once in the expected range, the target FA continues to increase until the change in CO between samples is less than a threshold. In other words, the routine determines when the increase in the target FA starts to have a lesser or minimal effect on the measured CO. This point may also correspond to a maximum CO2 level. Once this threshold is satisfied, an in-cylinder stoichiometric FA point is determined.

Once the in-cylinder stoichiometric FA point is determined, it is utilized to estimate the engine trapping efficiency. First, a trapped air charge is estimated by dividing the fuel mass at the in-cylinder stoichiometric FA point by a stoichiometric air/fuel ratio for the liquid fuel (e.g., gasoline). The stoichiometric FA for the liquid fuel is based on its composition (e.g., a function of a ratio of carbon atoms to hydrogen atoms and (ii) a ratio of carbon atoms to oxygen atoms), The trapping efficiency is then estimated by dividing the estimated trapped air charge by the measure total air charge into the cylinder 112 (e.g., from the MAF sensor 138). This limited CO sweep routine is run non-intrusively such that the change to the target FA of the engine 104 does not override or affect normal operation. The benefit of a limited CO sweep is that much less data needs to be accumulated (e.g., compared to a full CO sweep across all possible target FA values).

Figure 4A:
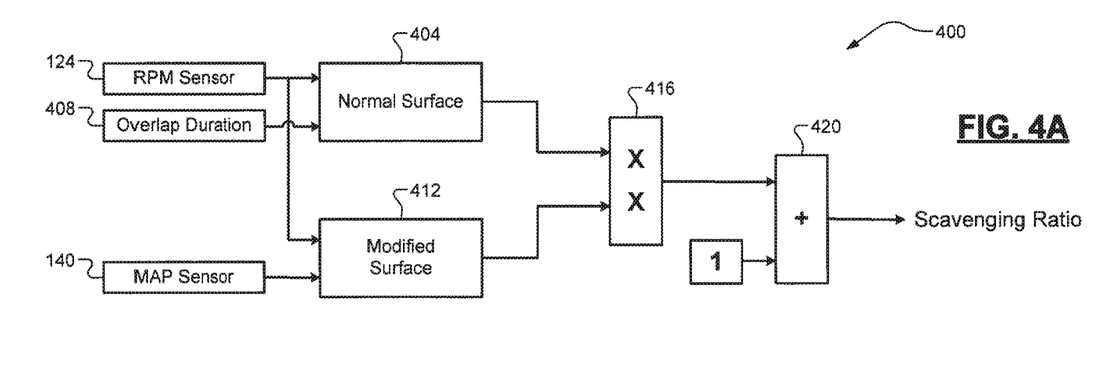
FIG. 4A is a functional block diagram of an example controller architecture for determining the engine scavenging ratio in real-time during engine operation according to the principles of the present disclosure.
Figure 4B:
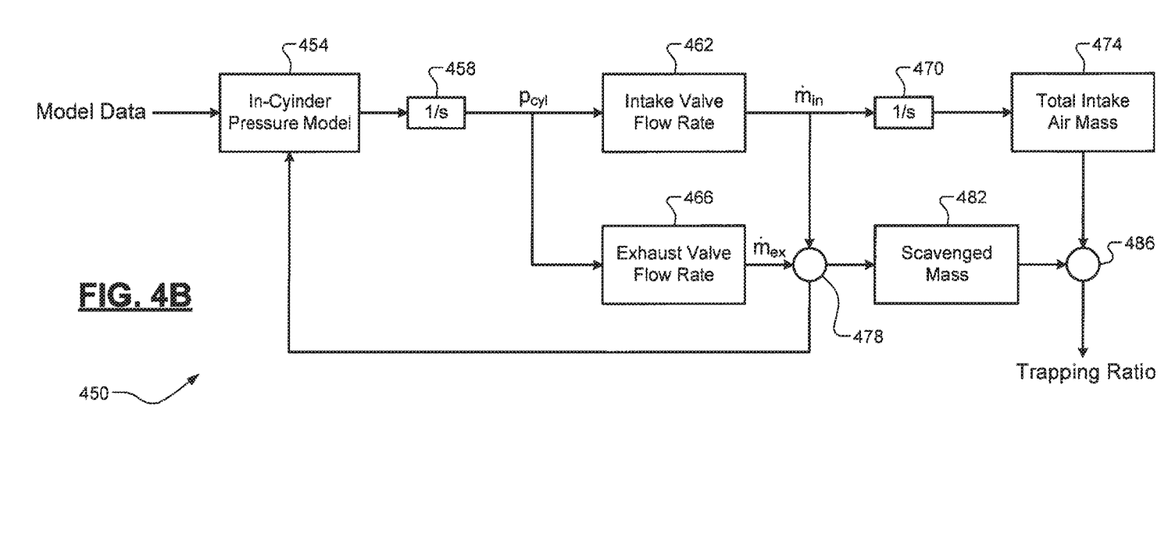
FIG. 4B is a functional block diagram of an example calibration system architecture for estimating the engine scavenging ratio based on measured intake/exhaust dynamic gas pressures during dynamometer testing at steady-state and/or transient conditions according to the principles of the present disclosure.

Referring now to FIGS. 4A-4B, functional block diagrams of example architectures 400, 450 for estimating the engine scavenging ratio based on measured intake/exhaust gas pressures during transient conditions as previously described herein are illustrated. While the limited CO sweep scavenging ratio estimation technique of FIG. 3 requires multiple runs at the same steady-state conditions, this technique is capable of running in real-time. The steady-state limited CO sweep estimation technique, while potentially more accurate, is also slower (e.g., due to the non-intrusive manner in which the routine waits for certain target FAs to be commanded) compared to the pressure-based technique described below and corresponding to the architectures 400, 450.

In FIG. 4A, architecture 400 for the controller 176 includes a normal or model surface 404 that models the engine scavenging ratio based on engine speed from the RPM sensor 124 and valve overlap duration 408 during scavenging. This valve overlap duration, for example, may be a predefined value corresponding to a particular camshaft profile being utilized. The normal surface 404 outputs the modeled engine scavenging ratio. A modified or calibrated multiplier surface 412 estimates a modifier or multiplier for the modeled scavenging ratio based on measurements from the MAP sensor 140 and the RPM sensor 124. This modifier or multiplier is applied to the modeled engine scavenging ratio at multiplier 416 and a quotient of the number 1 (numerator) and the output (an estimated engine scavenging ratio) of the multiplier 416 (denominator) is calculated to obtain the estimated engine trapping efficiency.

FIG. 4B illustrates a more specific architecture 450 for the calibration system 188 that estimates the engine scavenging ratio based on measured intake/exhaust pressure and modeled flow from an intake valve opening (IVO) point to an intake valve closing (IVC) point. An in-cylinder pressure model 454 models a pressure inside the cylinder 112 based on model parameters and an estimated scavenged mass from a previous cycle. Examples of the model data include intake/exhaust gas temperatures (from sensors 184), dynamic (crank angle resolved) intake/exhaust gas pressures (from sensors 154, 158), and predetermined or known parameters about the cylinders and/or the valves (cylinder volume, intake/exhaust valve flow area A, coefficient of discharge Cd, lift, etc.). By modeling the in-cylinder pressure, in-cylinder pressure sensors are not required, which decreases costs. Thus, this technique is a two-sensor solution (intake/exhaust pressure sensors 154, 158) compared to three or more sensor solutions.

The output of model 404 is integrated at 458 and the modeled in-cylinder pressure ($p_{cyl}$) is then fed to both an intake valve flow rate estimator 412 and an exhaust valve flow rate estimator 416. Each of these estimators 412, 416 estimates flow rates through the respective intake/exhaust valves 144, 148 of the cylinder. The outputs of estimators 412, 416 are an estimated total intake air mass flow rate (m_dot$_{in}$) and an estimated exhaust mass flow rate (m_dot$_{ex}$). The estimated total intake air mass is integrated at 420 and utilized at 424 for estimating the scavenging/trapping ratio of the engine 104. A sum of the total intake air and exhaust mass flow rates is obtained at 478, which represents the rate of change of in-cylinder mass. The rate of change of in-cylinder mass is fed back to the in-cylinder pressure model 454 and is also utilized at 482 for estimating the scavenging/trapping ratio.

Figure 5:
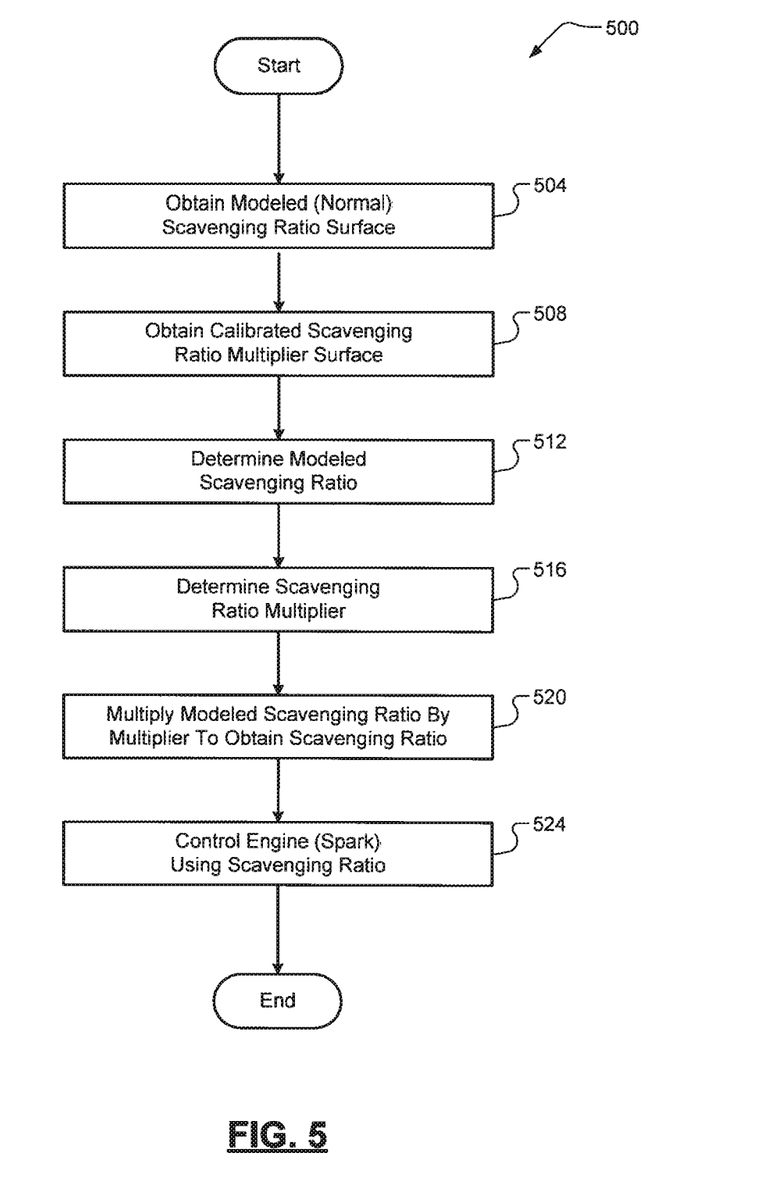
FIG. 5 is a flow diagram of an example method of determining a scavenging ratio of an internal combustion engine and controlling the engine based on the scavenging ratio according to the principles of the present disclosure.

Referring now to FIG. 5, a flow diagram of an example method 500 for determining the scavenging ratio of the engine 104 and controlling the engine 104 based on the scavenging ratio is illustrated. It will be appreciated that there could be a precondition or predetermination (not shown) where the controller 176 detects whether the engine 104 is currently scavenging before determining and utilizing the scavenging ratio for engine control. At 504, the controller 176 obtains a modeled (normal) surface relating various measurements of the RPM sensor 124 and valve overlap durations to modeled scavenging ratios of the engine 104. This modeled surface, for example, could be a predetermined conventional surface stored in a memory of the controller 176. At 508, the controller 176 obtains, from the calibration system 188, a calibrated multiplier surface relating various measurements of the MAP and RPM sensors 140, 124 to estimated scavenging ratios of the engine 104.

As previously discussed herein, this calibrated multiplier surface can be generated using a combination of the limited CO sweep (at steady-state dynamometer testing conditions) and the pressure-based estimation (at transient dynamometer testing conditions) or using the pressure-based estimation (at both steady-state and transient dynamometer testing conditions). It will be appreciated that the generation of the calibrated multiplier surface could only occur once, e.g., prior to vehicle delivery. At 512, the controller 176 determines a modeled scavenging ratio of the engine 104 based on the measured engine speed and a known overlap duration using the modeled surface (see 404 of FIG. 4A). At 516, the controller 176 determines a scavenging ratio multiplier based on the measured MAP and measured engine speed using the calibrated multiplier surface (see 412 of FIG. 4A). At 520, the controller 176 determines the scavenging ratio of the engine 104 by multiplying the modeled scavenging ratio by the scavenging ratio multiplier (see 416 of FIG. 4A). At 524, the controller 176 controls the engine based on the scavenging ratio (see 216 and 220 of FIG. 2). The method 500 then ends or returns to 512.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A system for estimating a scavenging ratio of an engine of a vehicle, the scavenging ratio relating to an overlap of opening of intake and exhaust valves of a cylinder of the engine, the system comprising:
    an intake manifold absolute pressure (MAP) sensor configured to measure a pressure of air in an intake manifold of the engine;
    an engine speed (RPM) sensor configured to measure a speed of the engine; and
    a controller of the engine, the controller being configured to:
        obtain a model surface relating various measurements of the RPM sensor and valve overlap durations to modeled scavenging ratios of the engine;
        obtain a calibrated multiplier surface relating various measurements of the MAP and RPM sensors to measured scavenging ratios of the engine;
        determine a modeled scavenging ratio of the engine based on the measured engine speed and a known overlap duration using the model surface;

determine a scavenging ratio multiplier based on the measured MAP and measured engine speed using the calibrated multiplier surface;

determine the scavenging ratio of the engine by multiplying the modeled scavenging ratio by the scavenging ratio multiplier; and control the engine based on the determined scavenging ratio.

2. The system of claim 1, further comprising:
a mass airflow (MAF) sensor configured to measure airflow into the engine;
an emissions analyzer configured to measure carbon monoxide (CO) content in exhaust gas produced by the engine; and
a calibration system in communication with the controller and configured to coordinate a limited range CO sweep including:
commanding a target fuel/air ratio (FA) for the engine;
obtaining the measured CO content in the exhaust gas;
when the measured CO content is outside of a threshold range, coordinating a decrease in the target FA and reobtain the measured CO content;
when the measured CO content is within the threshold range, obtaining an in-cylinder stoichiometric FA by coordinating an increase in the target FA until a magnitude of a difference between a current measured CO content and a previously measured CO content is less than a threshold;
determining a first estimate of the scavenging ratio of the engine based on measured airflow into the engine, the in-cylinder stoichiometric FA, and a stoichiometric FA for a liquid fuel of the engine; and
generating at least a portion of the calibrated multiplier surface based on the first estimated scavenging ratio.

3. The system of claim 2, wherein the calibration system is configured to coordinate the limited range CO sweep during steady state conditions where engine speed and load are held stable.

4. The system of claim 3, further comprising:
an intake gas pressure sensor configured to measure a pressure of intake gas proximate to the intake valve of the cylinder; and
an exhaust gas pressure sensor configured to measure a pressure of the exhaust gas proximate to the exhaust valve of the cylinder,
wherein the calibration system is further configured to coordinate a pressure-based estimation including:
estimating an in-cylinder gas pressure based on the measured intake and exhaust gas pressures and an estimated exhaust valve flow rate;
based on the estimated in-cylinder gas pressure, obtaining an estimated intake valve flow rate and the estimated exhaust valve flow rate;
estimating a total intake air mass based on the estimated intake valve flow rate;
estimating a scavenged mass based on the estimated intake and exhaust valve flow rates;
determining a second estimate of the scavenging ratio of the engine based on the estimated total intake air mass and the estimated scavenging mass; and
generating at least a portion of the calibrated multiplier surface based on the second estimated scavenging ratio.

5. The system of claim 4, wherein the calibration system is configured to coordinate the pressure-based estimation during transient conditions where at least one of the engine speed and load change by more than a threshold amount or at more than a threshold rate.

6. The system of claim of claim 1, further comprising:
an intake gas pressure sensor configured to measure a pressure of intake gas proximate to the intake valve of the cylinder;
an exhaust gas pressure sensor configured to measure a pressure of the exhaust gas proximate to the exhaust valve of the cylinder; and
a calibration system in communication with the controller and configured to coordinate a pressure-based estimation including:
estimating an in-cylinder gas pressure based on the measured intake and exhaust gas pressures and an estimated exhaust valve flow rate;
based on the estimated in-cylinder gas pressure, obtaining an estimated intake valve flow rate and the estimated exhaust valve flow rate;
estimating a total intake air mass based on the estimated intake valve flow rate;
estimating a scavenged mass based on the estimated intake and exhaust valve flow rates;
determining a first estimate of the scavenging ratio of the engine based on the estimated total intake air mass and the estimated scavenging mass; and
generating at least a portion of the calibrated multiplier surface based on the first estimated scavenging ratio.

7. The system of claim 6, wherein the calibration system is configured to coordinate the pressure-based estimation during transient conditions where at least one of engine speed and engine load change by more than a threshold amount or at more than a threshold rate.

8. The system of claim 7, further comprising:
a mass airflow (MAF) sensor configured to measure airflow into the engine; and
an emissions analyzer configured to measure carbon monoxide (CO) content in exhaust gas produced by the engine,
wherein the calibration system is further configured to coordinate a limited range CO sweep including:
commanding a target fuel/air ratio (FA) for the engine;
obtaining the measured CO content in the exhaust gas;
when the measured CO content is outside of a threshold range, coordinating a decrease in the target FA and reobtain the measured CO content;
when the measured CO content is within the threshold range, obtaining an in-cylinder stoichiometric FA by coordinating an increase in the target FA until a magnitude of a difference between a current measured CO content and a previously measured CO content is less than a threshold;
determining a second estimate of the scavenging ratio of the engine based on measured airflow into the engine, the in-cylinder stoichiometric FA, and a stoichiometric FA for a liquid fuel of the engine; and
generating at least a portion of the calibrated multiplier surface based on the first estimated scavenging ratio.

9. The system of claim 8, wherein the calibration system is configured to coordinate the limited range CO sweep during steady state conditions where the engine speed and load are held stable.

10. The system of claim 1, wherein the controller is further configured to:
determine a target total air charge for each cylinder of the engine based on an engine torque request;
determine a target trapped air charge based on a product of the target total air charge and an estimated trapping efficiency of the engine, the estimated trapping efficiency being an inverse of the estimated scavenging ratio; and control spark timing of the engine based on the target trapped air charge.

11. A method of determining a scavenging ratio of an engine of a vehicle, the scavenging ratio relating to an overlap of opening of intake and exhaust valves of a cylinder of the engine, the method comprising:

obtaining, by a controller of the engine and from an intake manifold absolute pressure (MAP) sensor, a measured pressure of air in an intake manifold of the engine;

obtaining, by the controller and from an engine speed (RPM) sensor, a measured speed of the engine;

obtaining, by the controller, a model surface relating various measurements of the RPM sensor and valve overlap durations to modeled scavenging ratios of the engine;

obtaining, by the controller, a calibrated multiplier surface relating various measurements of the MAP and RPM sensors to measured scavenging ratios of the engine;

determining, by the controller, a modeled scavenging ratio of the engine based on the measured engine speed and a known overlap duration using the model surface;

determining, by the controller, a scavenging ratio multiplier based on the measured MAP and measured engine speed using the calibrated multiplier surface;

determining, by the controller, the scavenging ratio of the engine by multiplying the modeled scavenging ratio by the scavenging ratio multiplier; and controlling, by the controller, the engine based on the determined scavenging ratio.

12. The method of claim 11, further comprising coordinating, by a calibration system in communication with the controller, a limited range carbon monoxide (CO) sweep comprising:

coordinating, by the calibration system, a target fuel/air ratio (FA) for the engine;

obtaining, by the calibration system and from a mass airflow (MAF) sensor, a measure airflow into the engine;

obtaining, by the calibration system and from an emissions analyzer, a measured CO content in exhaust gas produced by the engine;

obtaining, by the calibration system and from an emissions analyzer, a measured carbon monoxide (CO) content in exhaust gas produced by the engine;

when the measured CO content is outside of a threshold range, coordinating, by the calibration system, a decrease in the target FA and reobtain the measured CO content;

when the measured CO content is within the threshold range, obtaining, by the calibration system, an in-cylinder stoichiometric FA by coordinating an increase in the target FA until a magnitude of a difference between a current measured CO content and a previously measured CO content is less than a threshold;

determining, by the calibration system, a first estimate of the scavenging ratio of the engine based on measured airflow into the engine, the in-cylinder stoichiometric FA, and a stoichiometric FA for a liquid fuel of the engine; and generating, by the calibration system, at least a portion of the calibrated multiplier surface based on the first estimated scavenging ratio.

13. The method of claim 12, wherein the calibration system is configured to coordinate the limited range CO sweep during steady state conditions where engine speed and load are held stable.

14. The method of claim 13, further comprising coordinating, by the calibration system, a pressure-based estimation comprising:

obtaining, by the calibration system and from an intake gas pressure sensor, a measured pressure of intake gas proximate to the intake valve of the cylinder;

obtaining, by the calibration system and from an exhaust gas pressure sensor, a measured pressure of the exhaust gas proximate to the exhaust valve of the cylinder;

estimating, by the calibration system, an in-cylinder gas pressure based on the measured intake and exhaust gas pressures and an estimated exhaust valve flow rate;

based on the estimated in-cylinder gas pressure, obtaining, by the calibration system, an estimated intake valve flow rate and the estimated exhaust valve flow rate;

estimating, by the calibration system, a total intake air mass based on the estimated intake valve flow rate;

estimating, by the calibration system, a scavenged mass based on the estimated intake and exhaust valve flow rates;

determining, by the calibration system, a second estimate of the scavenging ratio of the engine based on the estimated total intake air mass and the estimated scavenging mass; and generating, by the calibration system, at least a portion of the calibrated multiplier surface based on the second estimated scavenging ratio.

15. The method of claim 14, wherein the calibration system is configured to coordinate the pressure-based estimation during transient conditions where at least one of the engine speed and load change by more than a threshold amount or at more than a threshold rate.

16. The method of claim of claim 11, further comprising coordinating, by a calibration system in communication with the controller, a pressure-based estimation comprising:

obtaining, by the calibration system and from an intake gas pressure sensor, a measured pressure of intake gas proximate to the intake valve of the cylinder;

obtaining, by the calibration system and from an exhaust gas pressure sensor, a measured pressure of the exhaust gas proximate to the exhaust valve of the cylinder;

estimating, by the calibration system, an in-cylinder gas pressure based on the measured intake and exhaust gas pressures and an estimated exhaust valve flow rate;

based on the estimated in-cylinder gas pressure, obtaining, by the calibration system, an estimated intake valve flow rate and the estimated exhaust valve flow rate;

estimating, by the calibration system, a total intake air mass based on the estimated intake valve flow rate;

estimating, by the calibration system, a scavenged mass based on the estimated intake and exhaust valve flow rates;

determining, by the calibration system, a first estimate of the scavenging ratio of the engine based on the estimated total intake air mass and the estimated scavenging mass; and generating, by the calibration system, at least a portion of the calibrated multiplier surface based on the first estimated scavenging ratio.

17. The method of claim 16, wherein the calibration system is configured to coordinate the pressure-based estimation during transient conditions where at least one of engine speed and engine load change by more than a threshold amount or at more than a threshold rate.

18. The method of claim 17, further comprising coordinating, by the calibration system, a limited range carbon monoxide (CO) sweep comprising:
- obtaining, by the calibration system and from a mass airflow (MAF) sensor, a measured airflow into the engine;
- coordinating, by the calibration system, a target fuel/air ratio (FA) for the engine;
- obtaining, by the calibration system and from an emissions analyzer, a measured CO content in exhaust gas produced by the engine;
- when the measured CO content is outside of a threshold range, coordinating, by the calibration system, a decrease in the target FA and reobtain the measured CO content;
- when the measured CO content is within the threshold range, obtaining, by the calibration system, an in-cylinder stoichiometric FA by coordinating an increase in the target FA until a magnitude of a difference between a current measured CO content and a previously measured CO content is less than a threshold;
- determining, by the calibration system, a second estimate of the scavenging ratio of the engine based on measured airflow into the engine, the in-cylinder stoichiometric FA, and a stoichiometric FA for a liquid fuel of the engine; and
- generating, by the calibration system, at least a portion of the calibrated multiplier surface based on the first estimated scavenging ratio.

19. The method of claim 18, wherein the calibration system is configured to coordinate the limited range CO sweep during steady state conditions where the engine speed and load are held stable.

20. The method of claim 11, further comprising:
- determining, by the controller, a target total air charge for each cylinder of the engine based on an engine torque request;
- determining, by the controller, a target trapped air charge based on a product of the target total air charge and an estimated trapping efficiency of the engine, the estimated trapping efficiency being an inverse of the estimated scavenging ratio; and
- controlling, by the controller, spark timing of the engine based on the target trapped air charge.

* * * * *